United States Patent
Pan et al.

(10) Patent No.: US 9,553,352 B2
(45) Date of Patent: Jan. 24, 2017

(54) COMMUNICATION DEVICE AND DISPLAY INCORPORATING ANTENNAS BETWEEN DISPLAY PIXELS

(71) Applicant: Intel Corporation, Santa Clara, CA (US)

(72) Inventors: Helen Kankan Pan, Portland, OR (US); Akihiro Takagi, San Mateo, CA (US); Bryce Horine, Aloha, OR (US); Harry G. Skinner, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 14/497,953

(22) Filed: Sep. 26, 2014

(65) Prior Publication Data

US 2016/0093940 A1 Mar. 31, 2016

(51) Int. Cl.
*H04B 1/38* (2015.01)
*H04M 1/00* (2006.01)
(Continued)

(52) U.S. Cl.
CPC .......... *H01Q 1/2258* (2013.01); *H01Q 1/1271* (2013.01); *H01Q 1/243* (2013.01); *H01Q 21/28* (2013.01); *H04B 1/1009* (2013.01)

(58) Field of Classification Search
CPC ....... H04B 1/3833; H04B 1/40; H04B 1/1009; H01Q 1/22; H01Q 1/40; H01Q 5/00; H01Q 1/2258; H01Q 1/1271; H01Q 1/243; H01Q 21/28
See application file for complete search history.

(56) References Cited

U.S. PATENT DOCUMENTS

| 5,745,079 A | 4/1998 | Wang et al. |
| 5,955,994 A | 9/1999 | Staker et al. |

(Continued)

FOREIGN PATENT DOCUMENTS

| CN | 105470632 A | 4/2016 |
| DE | 69835246 T2 | 5/2007 |

(Continued)

OTHER PUBLICATIONS

"U.S. Appl. No. 13/948,292, Non Final Office Action mailed Oct. 22, 2015", 16 pgs.

(Continued)

*Primary Examiner* — Nguyen Vo
(74) *Attorney, Agent, or Firm* — Schwegman Lundberg & Woessner, P.A.

(57) ABSTRACT

A display, such as for a touch-sensitive communication device, can include a transparent cover glass, pixels that emit light through the cover glass, and multiple antennas positioned along respective paths in an inactive area between the pixels. The antennas do not obstruct the light produced by the pixels, and can therefore be composed of opaque materials, such as metallic thin films, without affecting the optical properties of the display. In some examples, several antennas can have the same size and shape but different orientations, so that a radio can switch between or among the antennas to optimize reception. In some examples, the antennas can have different sizes and/or shapes, so that the antennas can send and/or receive radio signals in different frequency ranges of the electromagnetic spectrum. In some examples, locating the antennas in the display can allow the device to include a metallic housing.

8 Claims, 7 Drawing Sheets

(51) Int. Cl.
*H01Q 1/22* (2006.01)
*H04B 1/10* (2006.01)
*H01Q 1/12* (2006.01)
*H01Q 1/24* (2006.01)
*H01Q 21/28* (2006.01)

(56) References Cited

U.S. PATENT DOCUMENTS

| | | |
|---|---|---|
| 8,213,757 B2 | 7/2012 | Harrysson et al. |
| 2007/0040756 A1 | 2/2007 | Song et al. |
| 2008/0204327 A1 | 8/2008 | Lee et al. |
| 2009/0126777 A1* | 5/2009 | Khazeni ............... G02B 6/0038 136/246 |
| 2009/0254438 A1 | 10/2009 | Johnson, Jr. et al. |
| 2010/0053007 A1 | 3/2010 | Ni et al. |
| 2010/0073254 A1 | 3/2010 | Lee et al. |
| 2010/0261445 A1 | 10/2010 | Harrysson et al. |
| 2013/0050031 A1* | 2/2013 | Zhu ..................... H01Q 1/523 343/702 |
| 2013/0278480 A1* | 10/2013 | McMilin ............... H01Q 1/243 343/904 |
| 2014/0328084 A1* | 11/2014 | Chuang ............... H05K 5/0017 362/623 |
| 2015/0029064 A1 | 1/2015 | Pan et al. |
| 2015/0249485 A1* | 9/2015 | Ouyang ............... H04B 5/0081 455/41.1 |
| 2015/0255853 A1* | 9/2015 | Kwong .................... H01Q 1/24 343/702 |
| 2015/0303568 A1* | 10/2015 | Yarga ..................... H01Q 1/245 343/720 |

FOREIGN PATENT DOCUMENTS

| | | |
|---|---|---|
| DE | 102014011049 A1 | 1/2015 |
| DE | 102015011251 A1 | 3/2016 |
| EP | 0911906 A2 | 4/1999 |

OTHER PUBLICATIONS

"U.S. Appl. No. 13/948,292, Response filed Jan. 21, 2016 to Non Final Office Action mailed Oct. 22, 2015", 13 pgs.

Cheng, Roger, "Windows that double as cell signal boosters? Yes, please", [Online]. Retrieved from the Internet: <URL: http://reviews.cnet.com/8301-12261_7-57585614-10356022/windows-that-double-as-cell-signal-boosters-yes-please/>, (May 22, 2013), 8 pgs.

"U.S. Appl. No. 13/948,292, Final Office Action mailed Apr. 29, 2016", 19 pgs.

"German Application No. 102015011251.1, Office Action mailed Mar. 21, 2016", 16 pgs.

U.S. Appl. No. 13/948,292, filed Jul. 23, 2013, Optically Transparent Antenna for Wireless Communication and Energy Transfer.

* cited by examiner

COMMUNICATION DEVICE AND DISPLAY INCORPORATING ANTENNAS BETWEEN DISPLAY PIXELS

TECHNICAL FIELD

Embodiments described herein generally relate to wireless communication devices. Some embodiments described herein generally relate to incorporating multiple antennas into display panels.

BACKGROUND

In a communication device of a relatively small size, such as a cellular telephone or smart phone, it can be difficult to find space for a radio antenna in an interior of the device. For devices with multiple radio elements, each requiring an antenna of a different size, it can be even more difficult to find space for the antennas in the interior of the device. For devices having a metallic housing, it can be still more difficult, because the metallic housing can shield its interior from the radio signals.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
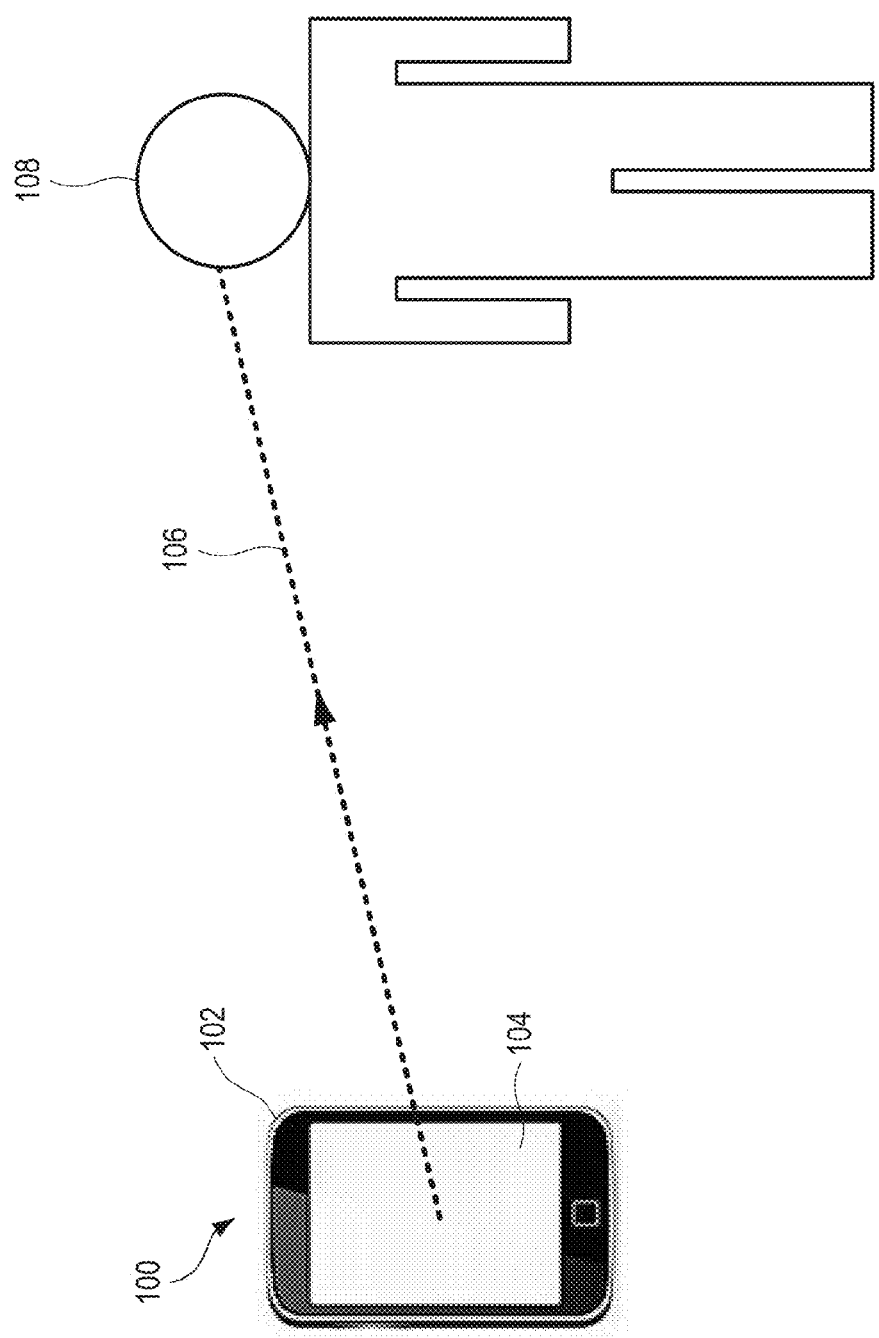
FIG. 1 shows an example of a communication device, such as a cellular telephone.

FIG. 1 shows an example of a wireless communication device 100, such as a cellular telephone or a smart phone. The communication device 100 can include a housing 102, which can be composed of a rugged material, such as plastic or metal. The communication device 100 can include a display 104 and associated circuitry to produce static and video images on the display 104. Light 106 from the display 104 can propagate from the display 104 to a user 108. The display 104 can optionally include touch sensitivity.

The display 104 can include a transparent cover glass, pixels that emit light through the cover glass, and multiple antennas positioned along respective paths in an inactive area between the pixels. The antennas do not obstruct the light produced by the pixels, and can therefore be composed of opaque materials, such as metallic thin films, without affecting the optical properties of the display 104. In some examples, several antennas can have the same size and shape but different orientations, so that a radio can switch between or among the antennas to optimize reception. In some examples, the antennas can have different sizes and/or shapes, so that the antennas can send and/or receive radio signals in different frequency ranges of the electromagnetic spectrum. In some examples, locating the antennas in the display can allow the device 100 to include a metallic housing 102, which would otherwise shield antennas located in the interior of the housing 102.

In some examples, a wireless communication device can include a housing, a transparent cover glass facing an exterior of the housing, a plurality of pixels configured to controllably emit light outward through the cover glass. The plurality of pixels can be arranged across an area of the cover glass. The plurality of pixels can define an inactive area therebetween within the area of the cover glass. The wireless communication device can further include a first antenna composed of a conductive material and positioned in a first path in the inactive area. The wireless communication device can further include a second antenna disposed on or within the housing away from the cover glass. The wireless communication device can further include a first radio element electrically coupled to one of the first antenna or the second antenna. For these examples, the wireless communication device can include switching circuitry that can switch the first radio element between the first and second antennas. The switching circuitry can switch to whichever antenna has better reception. In each of the configurations shown in the Figures and discussed below, the wireless communication device can include one or more additional antennas on or within the housing of the device. The additional antennas can include sizes and shapes selected to receive suitable wavelength or frequency regions of the electromagnetic spectrum. The device can include additional switching devices to switch between or among the various antennas, both included in the display and included in the housing but away from the display.

Figure 2:
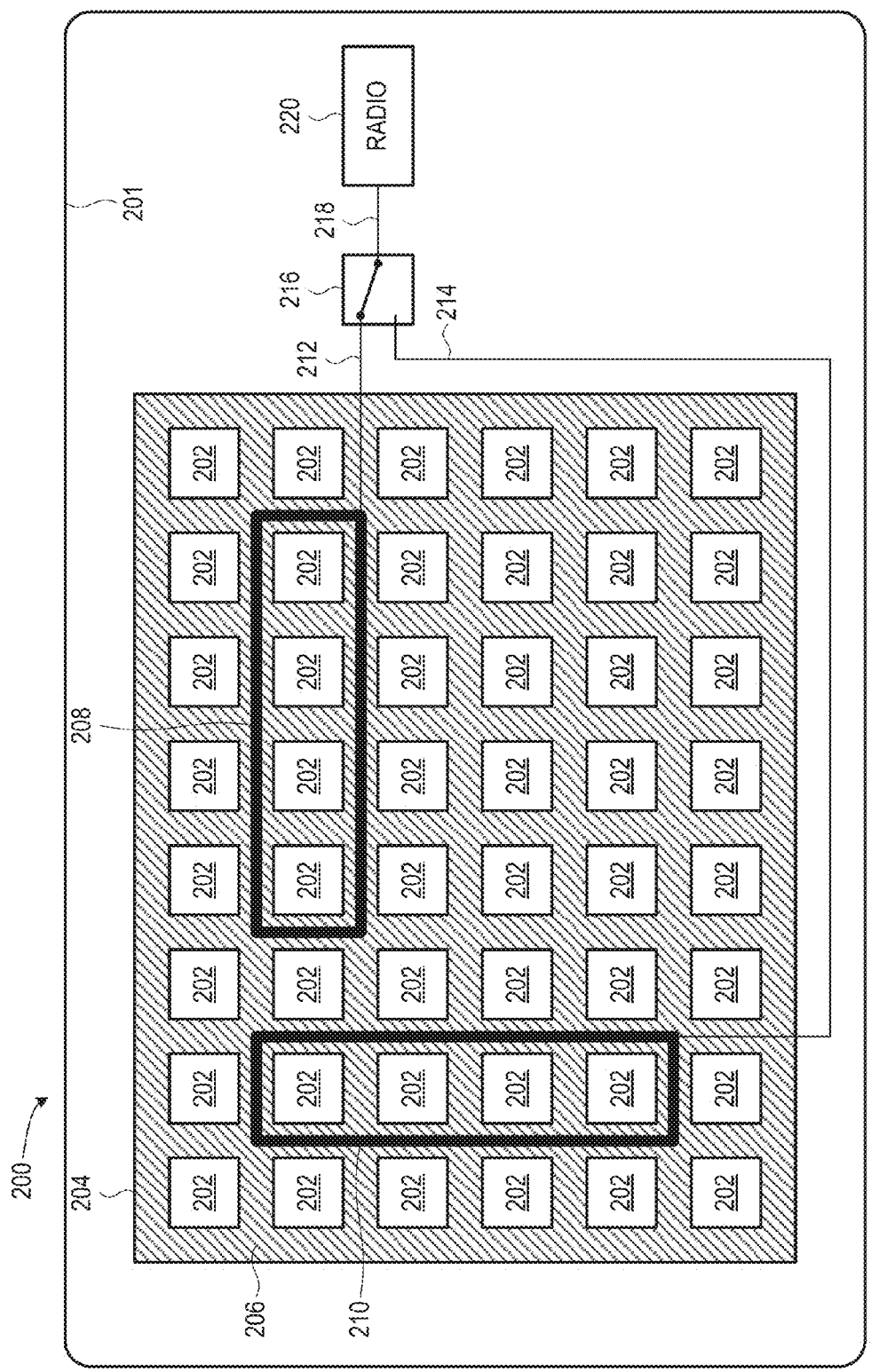
FIG. 2 is a front view of an example of a communication device.

FIG. 2 is a front view of an example of a communication device 200, such as device 100 from FIG. 1. The device 200 is but one example; other suitable communication devices can also be used.

The communication device 200 includes a housing 201, and a display 204 on the housing 201. The display 204 can include a transparent cover glass, which is not shown in FIG. 2, but would be parallel to the plane of the page and would face a user.

The display 204 can include a plurality of pixels 202 configured to controllably emit light through the cover glass. The plurality of pixels 202 can be arranged across an area of the cover glass. The plurality of pixels 202 can define an inactive area 206 therebetween within the area of the cover glass. In some examples, the inactive area 206 can be used for locating circuitry that powers the pixels 202, and for removing heat generated by the pixels 202.

In the example of FIG. 2, the pixels 202 are arranged in a rectangular grid. This is but one example, and other pixel arrangements can be used, including triangular or hexagonal array, polar arrays, and other suitable arrays.

In some examples, each pixel 202 can include elements that controllably emit red, green, and blue light, respectively. The elements can be electrically coupled to circuitry that controls the relative and/or absolute amounts of red, green, and blue light, so that the plurality of pixels 202 can display a full-color multi-pixel image and/or a full-color multiimage video signal. In other examples, one or more of the pixels 202 can be monochromatic.

The display 204 can include a first antenna 208 composed of a conductive material, such as aluminum, copper or another suitable metal or metal alloy. In some examples, the first antenna 208 can be formed by growing or depositing a thin metallic film on another element.

The first antenna 208 can be positioned in a first path in the inactive area 206. In the example of FIG. 2, the first antenna 208 is a horizontally-elongated rectangle. Other shapes for the first antenna 208 are possible, including squares, crosses, polygons, tree-like shapes, and others. In some examples, the shapes can include lines and curves that do not follow a rectangular grid but can be well-approximated in a step-wise fashion by the grid of pixels 202.

The display 204 can include a second antenna 210 composed of a conductive material and positioned in a second path in the inactive area 206, different from the first path. In some examples, the first and second antennas are composed of the same conductive materials; in other examples, first and second antennas are composed of different conductive materials.

The first and second antennas 208, 210 can be couple by first and second connections 212, 214 to a switch 216. An output 218 of the switch 216 can be connected to a first radio element 220. The communication device 200 can include switching circuitry that can control the switch 216, so that the first radio element 220 can be controllably switched between first antenna 208 and the second antenna 210. In other examples, the display 204 can include more than two antennas.

In some examples, such as the example of FIG. 2, the first and second paths have the same size and shape but different orientations within the inactive area 210. For instance, the first antenna 208 can be shaped as a horizontally-elongated rectangle, while the second antenna 210 can be shaped as a vertically-elongated rectangle, both with respect to the plane of the page of FIG. 2. Antennas having the same size and shape are tuned to send and receive the same band of frequencies in the electromagnetic spectrum. Using two or more antennas, tuned to the same frequency band but with different orientations, can allow the device 200 to switch between or among the antennas as needed, such as to improve reception. In some examples, the device 200 can include processing circuitry configured to determine which antenna, of the first and second antennas 208, 210, has better reception and direct the switching circuitry to electrically couple the first radio element 220 to the antenna, of the first and second antennas 208, 210, having better reception.

In some examples, the display 204 can include touch sensitivity. For instance, the display 204 can prompt a user by displaying images of one or more buttons, and a user can select an appropriate button by touching the display 204 in the area of one of the displayed buttons. In some examples, it may be desirable to avoid contact between a finger of the user and an antenna, because such contact may temporarily disrupt reception of radio signals to and/or from the contacted antenna. For these examples, it may be desirable to temporarily switch to an antenna that is outside the area of the selectable buttons or any other features that would prompt a touch response from a user. In some examples, the device 200 can include processing circuitry configured to determine a non-selectable area of the display 204 that is devoid of user-selectable features and direct the switching circuitry to electrically couple the first radio element 220 to an antenna, of the first and second antennas 208, 210, located within the non-selectable area.

Figure 3:
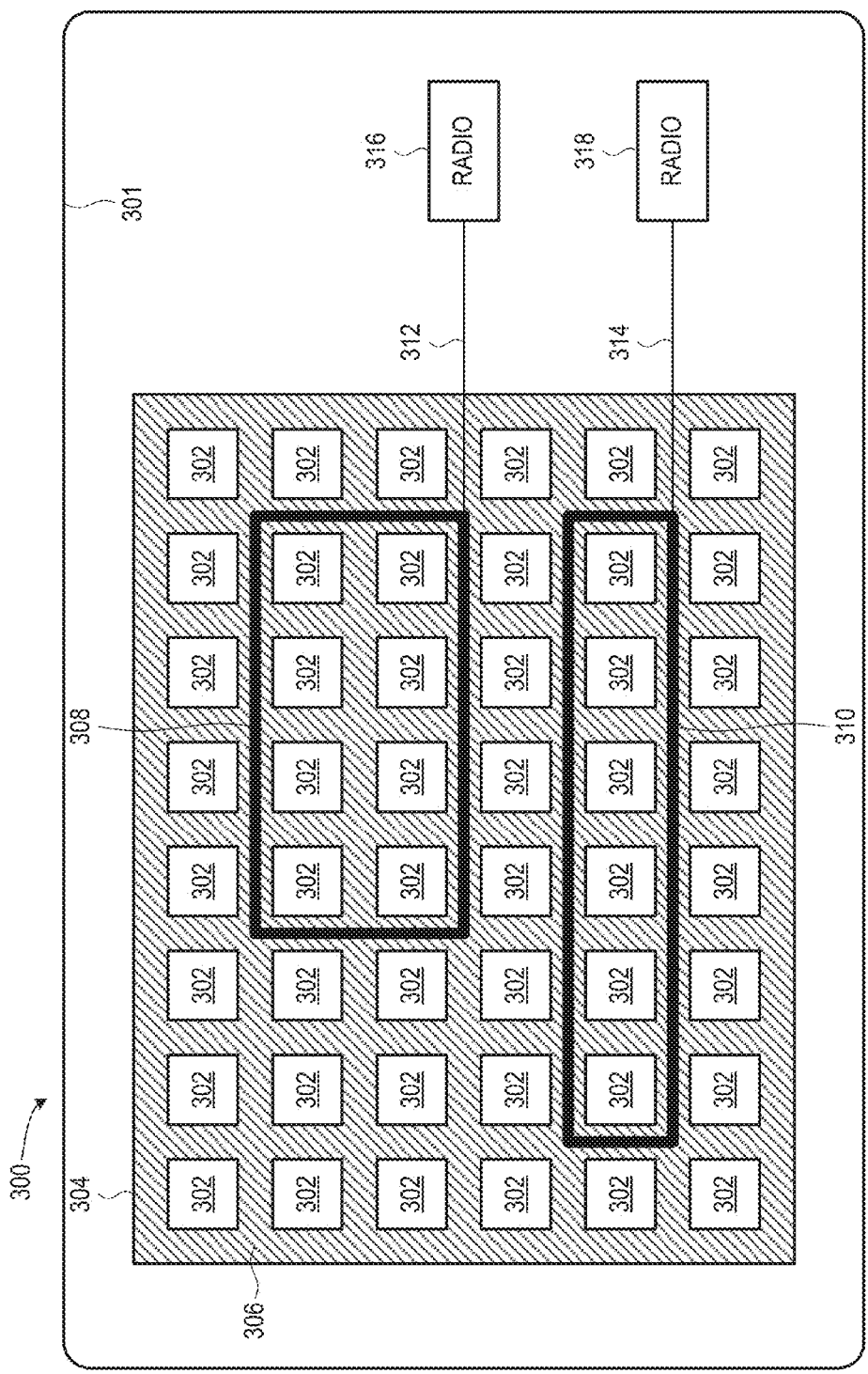
FIG. 3 is a front view of another example of a communication device.

FIG. 3 is a front view of another example of a communication device 300, such as device 100 from FIG. 1. The device 300 is but one example; other suitable communication devices can also be used. The device 300 includes a housing 301, a display 304 on the housing 301, and pixels 302 on the display 304, with an inactive area 306 between the pixels 302. Compared with the device 200 from FIG. 2, the device 300 includes first and second antennas 308, 310 that differ in at least one of size or shape within the inactive area 306.

A first radio element 316 can be electrically coupled by connection 312 to the first antenna 308. A second radio element 318 can be electrically coupled by connection 314 to the second antenna 310. In some examples, the first and second radio elements 316, 318 can be configured to receive radio signals in different frequency ranges of the electromagnetic spectrum. For instance, the first and second radio elements can include two of WiFi, Bluetooth, 3G, 4G, LTE, GPS, NFC, FM, and others, many of which use different frequency ranges of the electromagnetic spectrum and therefore can use different-sized antennas tuned to the particular frequency ranges. In other examples, the device 300 can include more than two radio elements. In some examples, the first radio element 316 can be used for cellular communications. In some examples, the second radio element 318 can be used for WiFi communications.

Figure 4:
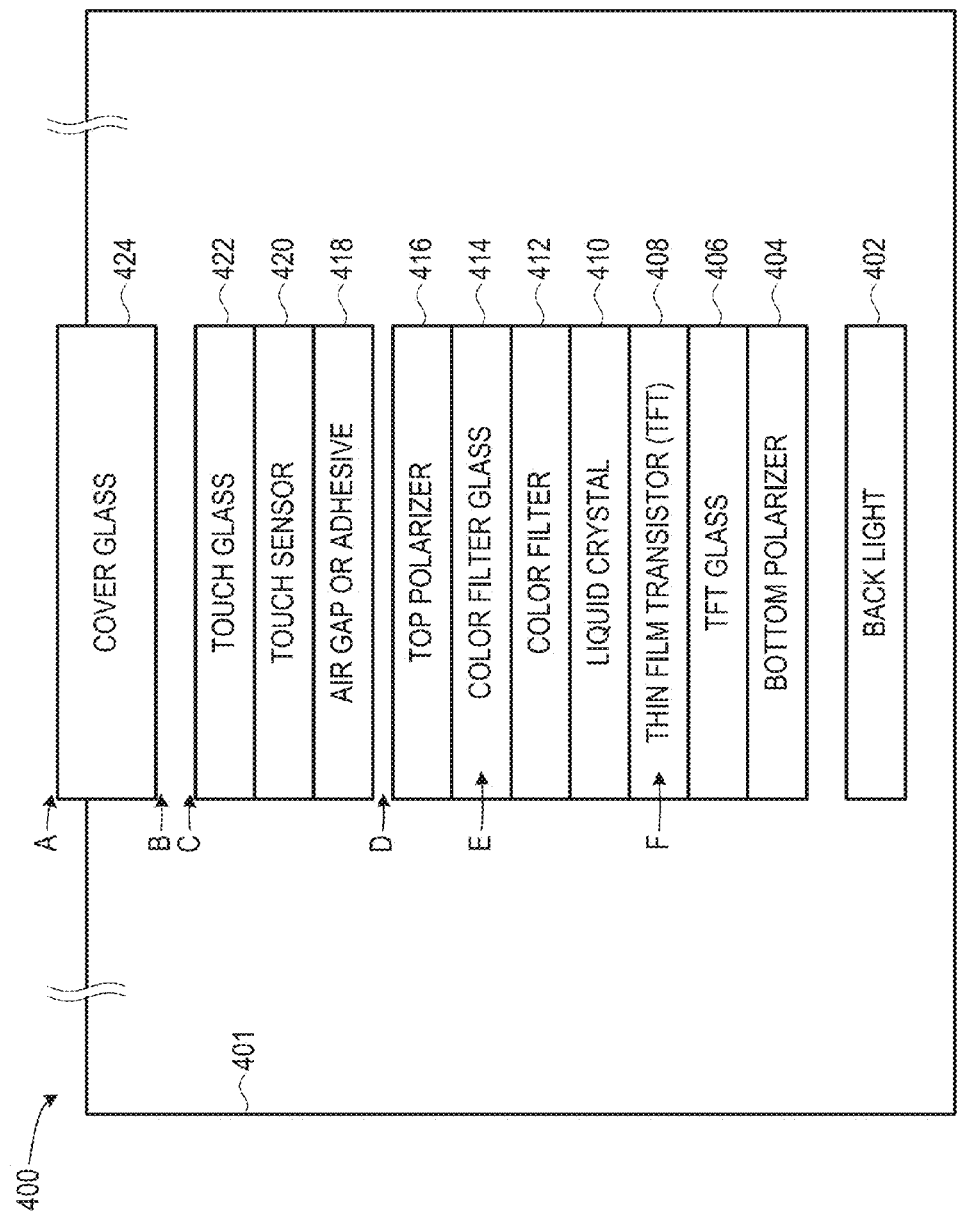
FIG. 4 is a side view of an example of a communication device, showing a housing and an example of a layered structure of the display.

FIG. 4 is a side view of an example of a communication device 400, showing a housing 401 and an example of a layered structure of the display. The layered structure is but one example, and other suitable layered structures can also be used. The elements of FIG. 4 are not drawn to scale. FIG. 4 also omits circuitry, radio elements, and other elements unrelated to the layered structure.

The layered structure includes a cover glass 424. Light emerges from the cover glass 424 toward an eye of a user. In the example of FIG. 4, the layered structure is touch-sensitive, so that a user can provide input to the communication by touching various locations on the cover glass 424. The touch-sensitivity can be dynamic, with buttons and other controls appearing as needed.

The layered structure can include layers having touch sensitivity, such as layers 418-422. The layered structure can include layers that control a light output of the plurality of pixels, such as layers 404-416. In other examples, the touch sensitivity layers and the light control layers can be rearranged as needed.

In the example of FIG. 4, light originates at the bottom-most element of the layered structure and propagates upward. In the example of FIG. 4, back light 402 produces generally featureless light. The generally featureless light extends across multiple pixels, and has an intensity that varies relatively slowly. The intensity of the generally featureless light does not vary at a frame rate of the display. The generally featureless light is selectively attenuated downstream in a pixel-by-pixel manner by the light control layers, such as 404-416. In some examples, the back light 402 produces white light, such as with one or more white-light light emitting diodes (LEDs). In other examples, the back light 402 produces light that is colored to match an average color of at least a portion of the image displayed on the display, such as with one or more red, green, and blue LEDs.

The light control layers include a bottom polarizer 404, a thin film transistor glass 406, a thin film transistor 408, a liquid crystal 410, a color filter 412, a color filter glass 414, and a top polarizer 416. The light control layers 404-416, as shown in FIG. 4, are referred to as a TFT layer design. Other suitable designs can be used and are compatible with the antennas shown in FIGS. 2 and 3.

In addition, the antennas of FIGS. 2 and 3 can be used with a display in which each pixel produces its own light, rather than attenuates light from a back light). For instance, in a display using three (or more) differently-colored organic light emitting diodes (OLEDs) for each pixel, the antennas of FIGS. 2 and 3 can be positioned in an inactive area between the pixels.

The touch-sensitive layers include a touch glass 422, a touch sensor 420, and an air gap or adhesive 418 that can compress in response to the effect of a user's touch. The touch-sensitive layers 418-422 is but one example; other suitable touch-sensitive layers and configurations can also be used.

In some examples, such as the example of FIG. 4, the touch-sensitive layers can be located closest to the cover glass 424. Locating the touch-sensitive layers close to the cover glass 424 can improve sensitivity to the user's touch, which can be desirable. In other examples, one or more of the touch-sensitive layers can be located further away from the cover glass 424 in the layered structure.

There are several locations within the layered structure that can accommodate antennas, such as the antennas shown in FIGS. 2 and 3. At location A, an antenna can be positioned on the cover glass 424. At location B, an antenna can be positioned under the cover glass 424. At location C, an antenna can be positioned on the touch glass 422. At location D, an antenna can be positioned between the air gap or adhesive 418 and the top polarizer 416. At location E, an antenna can be positioned within the color filter glass 414. At location F, an antenna can be positioned within the thin film transistor 408. These are but six examples of locations within the layered structure that can accommodate an antenna; other suitable locations can also be used.

In some examples, a first antenna and a second antenna can be disposed between a first pair of adjacent layers in the layered structure. This configuration can be used for antennas that do not overlap when viewed end-on, such as in the views of FIGS. 2 and 3.

In some examples, a first antenna can be disposed between a first pair of adjacent layers in the layered structure, and a second antenna can disposed between a second pair of adjacent layers in the layered structure, different from the first pair. This configuration can be used for any antennas, regardless of whether the antennas overlap.

In some examples, the layered structure can accommodate more than two antennas. For these examples, all, some, or none of the more than two antennas can overlap when viewed end-on, such as in the views of FIGS. 2 and 3.

Figure 5:
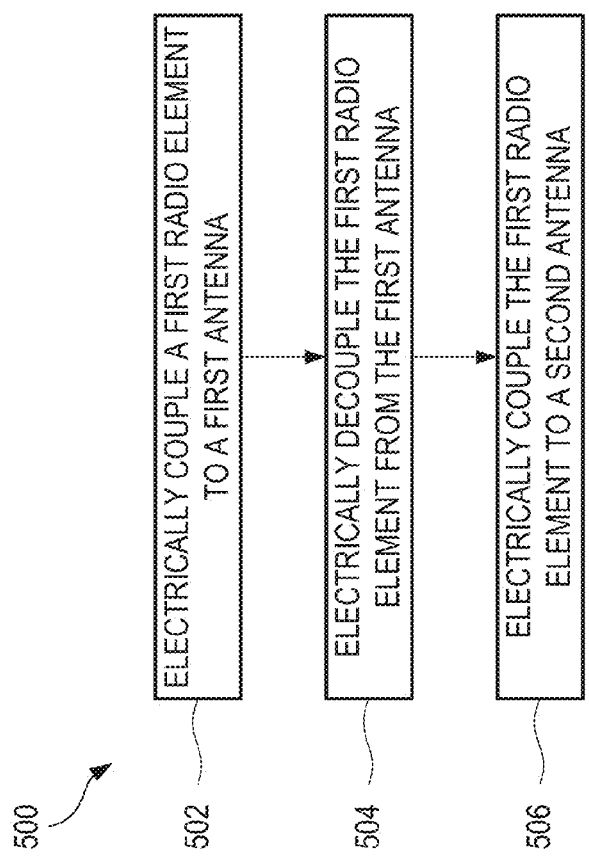
FIG. 5 shows a flow chart of an example of a method for operating a communication device.

FIG. 5 shows a flow chart of an example of a method 500 for operating a communication device, such as device 100 from FIG. 1 or other suitable devices. The method 500 is but one example of a method for operation; other suitable methods can also be used.

At 502, method 500 electrically couples a first radio element to a first antenna. The first antenna can be composed of a conductive material and positioned in a first path in an inactive area between light-emitting pixels of a display.

At 504, method 500 electrically decouples the first radio element from the first antenna.

At 506, method 500 electrically couples the first radio element to a second antenna. The second antenna can be composed of a conductive material and positioned in a second path in the inactive area, the second path differing from the first path.

In some examples, the first and second paths can have the same size and shape but different orientations within the inactive area.

The embodiments described above can be implemented in one or a combination of hardware, firmware, and software. Various methods or techniques, or certain aspects or portions thereof, can take the form of program code (i.e., instructions) embodied in tangible media, such as flash memory, hard drives, portable storage devices, read-only memory (ROM), random-access memory (RAM), semiconductor memory devices (e.g., Electrically Programmable Read-Only Memory (EPROM), Electrically Erasable Programmable Read-Only Memory (EEPROM)), magnetic disk storage media, optical storage media, and any other machine-readable storage medium or storage device wherein, when the program code is loaded into and executed by a machine, such as a computer or networking device, the machine becomes an apparatus for practicing the various techniques.

A machine-readable storage medium or other storage device can include any non-transitory mechanism for storing information in a form readable by a machine (e.g., a computer). In the case of program code executing on programmable computers, the computing device can include a processor, a storage medium readable by the processor (including volatile and non-volatile memory and/or storage elements), at least one input device, and at least one output device. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

Figure 6:
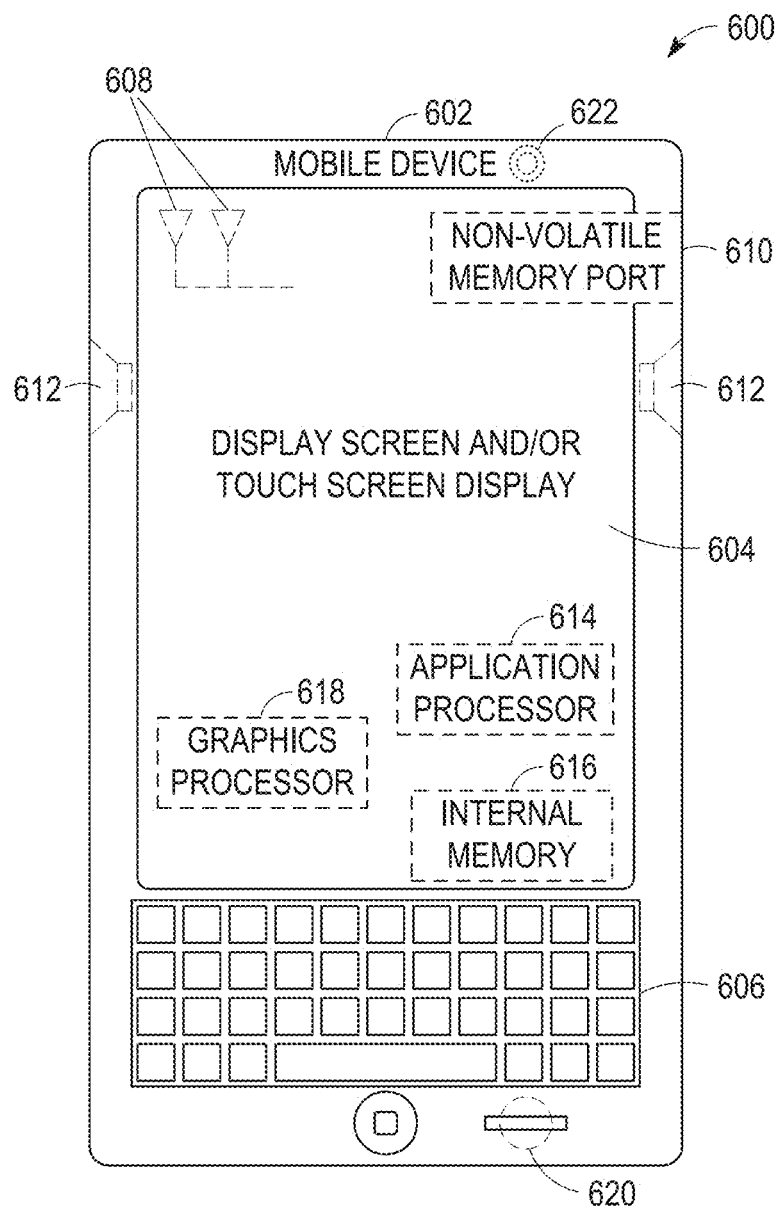
FIG. 6 illustrates an example of a mobile client device on which the configurations and techniques described herein can be deployed.

FIG. 6 illustrates an example of a mobile device 600. The mobile device 600 can be a user equipment (UE), a mobile station (MS), a mobile wireless device, a mobile communication device, a tablet, a handset, or other type of mobile wireless computing device. The mobile device 600 can include one or more antennas 608 within housing 602 that are configured to communicate with a hotspot, base station (BS), an evolved NodeB (eNodeB), or other type of WLAN or WWAN access point. The mobile device 600 can be configured to communicate using multiple wireless communication standards, including standards selected from 3GPP LTE, WiMAX, High Speed Packet Access (HSPA), Bluetooth, and Wi-Fi standard definitions. The mobile device 600 can communicate using separate antennas for each wireless communication standard or shared antennas for multiple wireless communication standards. The mobile device 600 can communicate in a WLAN, a WPAN, and/or a WWAN.

FIG. 6 also shows a microphone 620 and one or more speakers 612 that can be used for audio input and output from the mobile device 600. A display screen 604 can be a liquid crystal display (LCD) screen, or other type of display screen such as an organic light emitting diode (OLED) display. The display screen 604 can be configured as a touch screen. The touch screen can use capacitive, resistive, or another type of touch screen technology. An application processor 614 and a graphics processor 618 can be coupled to internal memory 616 to provide processing and display capabilities. A non-volatile memory port 610 can also be used to provide data input/output options to a user. The non-volatile memory port 610 can also be used to expand the memory capabilities of the mobile device 600. A keyboard 606 can be integrated with the mobile device 600 or wirelessly connected to the mobile device 600 to provide additional user input. A virtual keyboard can also be provided using the touch screen. A camera 622 located on the front (display screen) side or the rear side of the mobile device 600 can also be integrated into the housing 602 of the mobile device 600.

Figure 7:
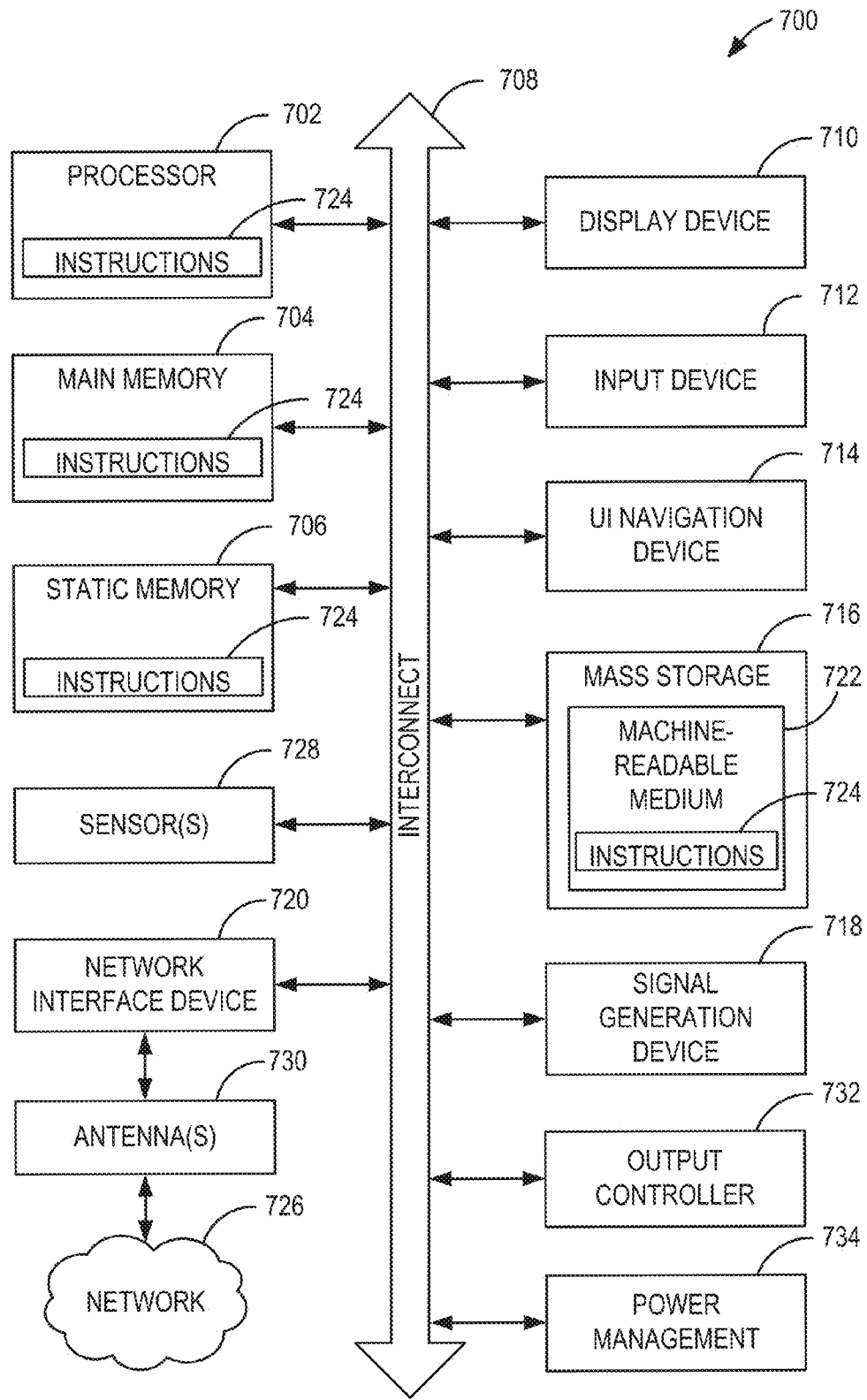
FIG. 7 illustrates an example computer system that can be used as a computing platform for the computing or networking devices described herein.

FIG. 7 is a block diagram illustrating an example computer system machine 700 upon which any one or more of the methodologies herein discussed can be run. Computer system machine 700 can be embodied as the UE 202, the eNB 204, the WLAN 206, or any other computing platform described or referred to herein. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC) that may or may not be portable (e.g., a notebook or a netbook), a tablet, a set-top box (STB), a gaming console, a Personal Digital Assistant (PDA), a mobile telephone or smartphone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system machine 700 includes a processor 702 (e.g., a central processing unit (CPU), a graphics processing unit (GPU) or both), a main memory 704 and a static memory 706, which communicate with each other via an interconnect 708 (e.g., a link, a bus, etc.). The computer system machine 700 can further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are a touch screen display. The computer system machine 700 can additionally include a storage device 716 (e.g., a drive unit), a signal generation device 718 (e.g., a speaker), an output controller 732, a power management controller 734, and a network interface device 720 (which can include or operably communicate with one or more antennas 730, transceivers, or other wireless communications hardware), and one or more sensors 728, such as a Global Positioning Sensor (GPS) sensor, compass, location sensor, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 can also reside, completely or at least partially, within the main memory 704, static memory 706, and/or within the processor 702 during execution thereof by the computer system machine 700, with the main memory 704, static memory 706, and the processor 702 also constituting machine-readable media.

While the machine-readable medium 722 is illustrated in an example embodiment to be a single medium, the term "machine-readable medium" can include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions.

The instructions 724 can further be transmitted or received over a communications network 726 using a transmission medium via the network interface device 720 utilizing any one of a number of well-known transfer protocols (e.g., HTTP). The term "transmission medium" shall be taken to include any intangible medium that is capable of storing, encoding, or carrying instructions for execution by the machine, and includes digital or analog communications signals or other intangible medium to facilitate communication of such software.

Although the devices and methods described above include two or more antennas in the inactive area between display pixels, there can be alternatives that use only a single antenna disposed in the inactive area between display pixels. This single antenna can be sized, shaped, and oriented in any suitable manner in the inactive display. This single antenna can be located in any suitable location within a layered structure, such as the layered structure shown in FIG. 4. In some of these alternatives, there can also be one or more antennas positioned in an interior of the device. These interior antennas can be switched, along with the single antenna on the display, in a manner similar to the switching configuration of FIG. 2.

Although the devices and methods described above include two or more antennas in the inactive area between display pixels, there can be alternatives that use one or more antennas composed of a relatively transparent material, such as Indium Tin Oxide (ITO). One or more of the transparent antennas can be located anywhere on the display, not just in the inactive area between display pixels. In general, the alignment requirement of an antenna to the pixel geometry can be relaxed based on the transparency characteristics of the antenna material. The transparent antennas can be located in any suitable location within a layered structure, such as the layered structure shown in FIG. 4.

It should be understood that the functional units or capabilities described in this specification can have been referred to or labeled as components or modules, in order to more particularly emphasize their implementation independence. For example, a component or module can be implemented as a hardware circuit comprising custom very-large-scale integration (VLSI) circuits or gate arrays, off-the-shelf semiconductors such as logic chips, transistors, or other discrete components. A component or module can also be implemented in programmable hardware devices such as field programmable gate arrays, programmable array logic, programmable logic devices, or the like. Components or modules can also be implemented in software for execution by various types of processors. An identified component or module of executable code can, for instance, comprise one or more physical or logical blocks of computer instructions, which can, for instance, be organized as an object, procedure, or function. Nevertheless, the executables of an identified component or module need not be physically located together, but can comprise disparate instructions stored in different locations which, when joined logically together, comprise the component or module and achieve the stated purpose for the component or module.

Indeed, a component or module of executable code can be a single instruction, or many instructions, and can even be distributed over several different code segments, among different programs, and across several memory devices. Similarly, operational data can be identified and illustrated herein within components or modules, and can be embodied in any suitable form and organized within any suitable type of data structure. The operational data can be collected as a single data set, or can be distributed over different locations including over different storage devices, and can exist, at least partially, merely as electronic signals on a system or network. The components or modules can be passive or active, including agents operable to perform desired functions.

Additional examples of the presently described method, system, and device embodiments include the following, non-limiting configurations. Each of the following non-limiting examples can stand on its own, or can be combined in any permutation or combination with any one or more of the other examples provided below or throughout the present disclosure.

Example 1 is a display, comprising: a transparent cover glass; a plurality of pixels configured to controllably emit light through the cover glass, the plurality of pixels arranged across an area of the cover glass, the plurality of pixels defining an inactive area therebetween within the area of the cover glass; a first antenna composed of a conductive material and positioned in a first path in the inactive area; and a second antenna composed of a conductive material and positioned in a second path in the inactive area, different from the first path.

In Example 2, the subject matter of Example 1 can optionally include wherein the first and second paths have the same size and shape and different orientations within the inactive area.

In Example 3, the subject matter of any one of Examples 1-2 can optionally include a first radio element; and switching circuitry configured to switch between electrically coupling the first radio element to the first antenna and electrically coupling the first radio element to the second antenna.

In Example 4, the subject matter of Examples 1 or 3 can optionally include wherein the first and second paths differ in at least one of size or shape within the inactive area.

In Example 5, the subject matter of any one of Examples 1, 3 or 4 can optionally include a first radio element electrically coupled to the first antenna; and a second radio element electrically coupled to the second antenna, the first and second radio elements configured to receive radio signals in different frequency ranges of the electromagnetic spectrum.

In Example 6, the subject matter of any one of Examples 1-5 can optionally include wherein the cover glass is part of a layered structure; wherein the layered structure includes layers having touch sensitivity; and wherein the layered structure includes layers that control a light output of the plurality of pixels.

In Example 7, the subject matter of Example 6 can optionally include wherein the first antenna and the second antenna are disposed between a first pair of adjacent layers in the layered structure.

In Example 8, the subject matter of Example 6 can optionally include wherein the first antenna is disposed between a first pair of adjacent layers in the layered structure; and wherein the second antenna is disposed between a second pair of adjacent layers in the layered structure, different from the first pair.

Example 9 is a wireless communication device, comprising: a housing; a transparent cover glass facing an exterior of the housing; a plurality of pixels, the plurality of pixels configured to controllably emit light outward through the cover glass, the plurality of pixels arranged across an area of the cover glass, the plurality of pixels defining an inactive area therebetween within the area of the cover glass; a first antenna composed of a conductive material and positioned in a first path in the inactive area; a second antenna disposed on or within the housing away from the cover glass; and a first radio element electrically coupled to one of the first antenna or the second antenna.

In Example 10, the subject matter of Example 9 can optionally include wherein the first and second antennas have the same size and shape but different orientations.

In Example 11, the subject matter of Example 10 can optionally include switching circuitry configured to switch between electrically coupling the first radio element to the first antenna and electrically coupling the first radio element to the second antenna.

In Example 12, the subject matter of Example 11 can optionally include processing circuitry configured to: determine which antenna, of the first and second antennas, has better reception; and direct the switching circuitry to electrically couple the first radio element to the antenna, of the first and second antennas, having better reception.

In Example 13, the subject matter of Example 11 or 12 can optionally include a third antenna composed of a conductive material and positioned in a second path in the inactive area, different from the first path; and processing circuitry configured to: determine a non-selectable area of the display that is devoid of user-selectable features; and direct the switching circuitry to electrically couple the first radio element to an antenna, of the first and third antennas, located within the non-selectable area.

In Example 14, the subject matter of Example 13 can optionally include wherein the cover glass is part of a layered structure; wherein the layered structure includes layers having touch sensitivity; and wherein the layered structure includes layers that control a light output of the plurality of pixels.

In Example 15, the subject matter of Example 14 can optionally include wherein the first antenna and the third antenna are disposed between a first pair of adjacent layers in the layered structure.

In Example 16, the subject matter of Example 14 can optionally include wherein the first antenna is disposed between a first pair of adjacent layers in the layered structure; and wherein the third antenna is disposed between a second pair of adjacent layers in the layered structure, different from the first pair.

In Example 17, the subject matter of Example 9 can optionally include wherein the first and second antennas differ in at least one of size or shape within the inactive area.

In Example 18, the subject matter of Example 17 can optionally include wherein the first radio element is electrically coupled to the first antenna; and further comprising: a second radio element electrically coupled to the second antenna, the first and second radio elements configured to receive radio signals in different frequency ranges of the electromagnetic spectrum.

Example 19 is a method for operating a wireless communication device, comprising: electrically coupling a first radio element to a first antenna, the first antenna being composed of a conductive material and positioned in a first path in an inactive area between light-emitting pixels of a display; electrically decoupling the first radio element from the first antenna; and electrically coupling the first radio element to a second antenna, the second antenna composing a conductive material and positioned in a second path in the inactive area, the second path differing from the first path.

In Example 20, the subject matter of Example 19 can optionally include wherein the first and second paths have the same size and shape but different orientations within the inactive area.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A display, comprising:
    a transparent cover glass;
    a plurality of pixels configured to controllably emit light through the cover glass, the plurality of pixels arranged across an area of the cover glass, the plurality of pixels defining an inactive area between at least a portion of the plurality of pixels and within the area of the cover glass where the plurality of pixels are arranged;
    a first antenna composed of a conductive material and positioned in a first path in the inactive area, between the at least a portion of the plurality of pixels; and
    a second antenna composed of a conductive material and positioned in a second path in the inactive area, between the at least a portion of the plurality of pixels, the second path being different from the first path;
    wherein the cover glass is part of a layered structure, the layered structure including layers that have touch sensitivity and that control a light output of the plurality of pixels;
    wherein the first antenna is disposed between a first pair of adjacent layers in the layered structure; and
    wherein the second antenna is disposed between a second pair of adjacent layers in the layered structure, different from the first pair.

2. The display of claim 1, wherein the first and second paths have the same size and shape and different orientations within the inactive area.

3. The display of claim 2, further comprising:
    a first radio element; and
    switching circuitry configured to switch between electrically coupling the first radio element to the first antenna and electrically coupling the first radio element to the second antenna.

4. The display of claim 1, wherein the first and second paths differ in at least one of size or shape within the inactive area.

5. The display of claim 4, further comprising:
    a first radio element electrically coupled to the first antenna; and
    a second radio element electrically coupled to the second antenna, the first and second radio elements configured to receive radio signals in different frequency ranges of the electromagnetic spectrum.

6. A method for operating a wireless communication device, comprising:
    electrically coupling a first radio element to a first antenna, the first antenna being composed of a conductive material and positioned in a first path in an inactive area, the inactive area disposed between light-emitting pixels of a display with a transparent cover glass;
    electrically decoupling the first radio element from the first antenna; and
    electrically coupling the first radio element to a second antenna, the second antenna composing a conductive material and positioned in a second path in the inactive area, the second path differing from the first path, the first and second antenna disposed between the light-emitting pixels of the display;
    wherein the cover glass is part of a layered structure, the layered structure including layers that have touch sensitivity and that control a light output of the plurality of pixels;
    wherein the first antenna is disposed between a first pair of adjacent layers in the layered structure; and
    wherein the second antenna is disposed between a second pair of adjacent layers in the layered structure, different from the first pair.

7. The method of claim 6, wherein the first and second paths have the same size and shape but different orientations within the inactive area.

8. The method of claim 6, wherein one or both of the first path and the second path encircle at least one of the plurality of pixels.

* * * * *